United States Patent
Chakra et al.

(10) Patent No.: US 8,525,850 B2
(45) Date of Patent: Sep. 3, 2013

(54) AUTOMATIC TARGETING OF BROWSER CONTENT TO OPTIMAL RENDERING ENGINE

(75) Inventors: Al Chakra, Raleigh, NC (US); Adam R. Cook, Durham, NC (US); Jonathan Lidaka, Durham, NC (US); Ryan E. Smith, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 12/650,619

(22) Filed: Dec. 31, 2009

(65) Prior Publication Data

US 2011/0157219 A1    Jun. 30, 2011

(51) Int. Cl.
*G09G 5/00*     (2006.01)

(52) U.S. Cl.
USPC .......................................... 345/619; 345/581

(58) Field of Classification Search
None
See application file for complete search history.

(56) References Cited

U.S. PATENT DOCUMENTS

| | | | |
|---|---|---|---|
| 5,459,827 A * | 10/1995 | Allouche et al. | 715/204 |
| 7,216,294 B2 | 5/2007 | Gibbs et al. | |
| 7,257,628 B2 * | 8/2007 | Liskov et al. | 709/223 |
| 2004/0204997 A1 * | 10/2004 | Blaser et al. | 705/14 |
| 2007/0038643 A1 * | 2/2007 | Epstein | 707/10 |

* cited by examiner

*Primary Examiner* — Joni Richer
*Assistant Examiner* — Michelle Chin
(74) *Attorney, Agent, or Firm* — Steve M. Greenberg, Esq.; Carey, Rodriguez, Greenberg & O'Keefe

(57) ABSTRACT

Embodiments of the present invention provide a method, system and computer program product for content driven selection of a rendering engine. In an embodiment of the invention, a method for or content driven selection of a rendering engine can include retrieving content for display in a content browser executing in memory by a processor of a host computer, mapping at least one directive embedded in the retrieved content to a target rendering engine, selecting the target rendering engine for rendering the content, and passing the content to the selected target rendering engine. In this regard, in an aspect of the embodiment, multiple directives embedded in the retrieved content can be mapped, each to one of a selection of different target rendering engines, and a most often mapped one of the target rendering engines can be selected for rendering the content.

11 Claims, 1 Drawing Sheet

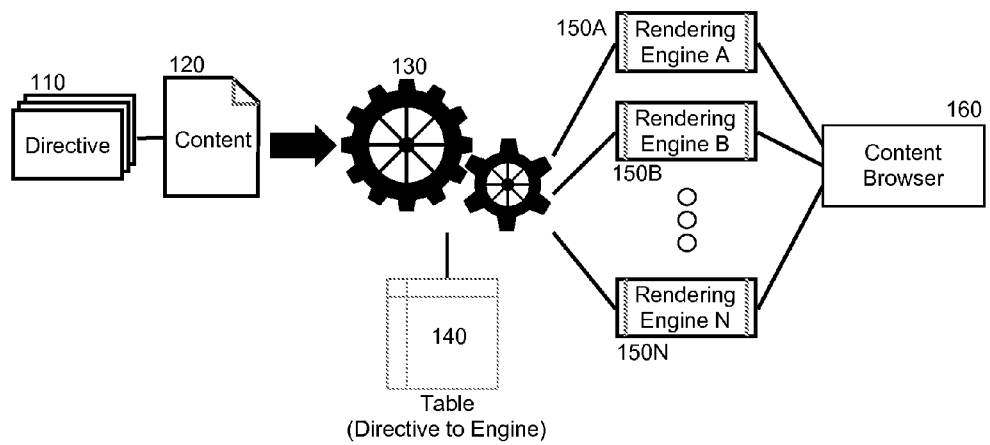
FIG. 1
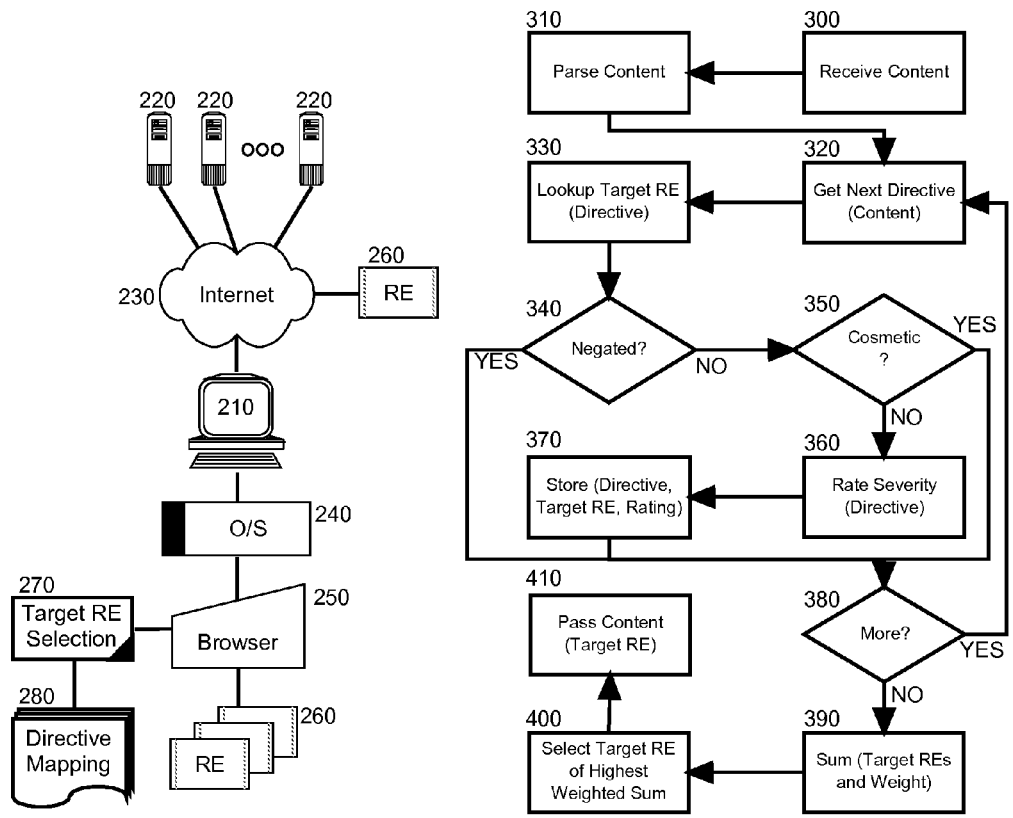
FIG. 2
FIG. 3

AUTOMATIC TARGETING OF BROWSER CONTENT TO OPTIMAL RENDERING ENGINE

BACKGROUND OF THE INVENTION

1. Field of the Invention

The present invention relates to content browsing over a computer communications network and more particularly to content browser selection for browser compatibility.

2. Description of the Related Art

Content distribution depends heavily upon the electronic distribution of content over the global Internet. The World Wide Web (the "Web") provides the principal conduit through which content is distributed and the venerable content browser serves as the low cost tool for requesting, retrieving and rendering content over the Web. Content distributed over the Web generally includes markup formatting embedded presentable elements such as text, graphics, video or audio. The hypertext markup language ("HTML") has always been the preferred language for markup formatting presentable elements in content. Most commercially distributed content browsers handle HTML formatted content uniformly.

Content distributed over the Web, however, has progressed from mere static pages to full-blown user customizable applications. To achieve the advanced presentation of content over the Web, several additional technologies have become part and parcel of content delivery strategies. Those technologies include dynamic HTML ("DHTML"), cascading style sheets ("CSS"), embedded scripts such as those comporting with the javascript specification, to name only a few. Unlike HTML, however, most conventional content browsers handle portions of CSS and javascript differently. Thus, inherent browser incompatibilities drive content developers to limit the use of these additional technologies only to those aspects uniformly handled across different content browsers.

Content developers seeking to capitalize upon Web 2.0 mechanisms do not have the luxury of omitting important features of CSS and javascript to ensure uniform treatment of content across different content browsers. Consequently, content developers rely upon existing tools for ensuring the use of a particular content browser when rendering specific content. For example, one commercially available content browser provides for an extension programmed to force the loading of content from a selection of pre-determined Web sites using a specific browser. In this instance, the end user in control of the content browser provides an a prior determination of which content browser is best suited to handle content from a particular Web site. Another extension known in the art is programmed to respond to a manual command to use a specific content browser when rendering a selected Web page. Again, the determination of when to use the specific content browser to render the selected Web page remains with the end user.

BRIEF SUMMARY OF THE INVENTION

Embodiments of the present invention address deficiencies of the art in respect to content rendering and provide a novel and non-obvious method, system and computer program product for content driven selection of a rendering engine. In an embodiment of the invention, a method for or content driven selection of a rendering engine can include retrieving content for display in a content browser executing in memory by a processor of a host computer, mapping at least one directive embedded in the retrieved content to a target rendering engine, selecting the target rendering engine for rendering the content, and passing the content to the selected target rendering engine. In this regard, in an aspect of the embodiment, multiple directives embedded in the retrieved content can be mapped, each to one of a selection of different target rendering engines, and a most often mapped one of the target rendering engines can be selected for rendering the content. Optionally, a content browser including the selected target rendering engine can be selected to both render and display the content.

In another embodiment of the invention, a content browsing data processing system can be provided. The system can include a host computer with processor and memory, a content browser executing in the memory by the processor of the host computer, and different rendering engines coupled to the content browser. Finally, a target rendering engine selection module can be coupled to the content browser. The module can include program code that when executed by the processor of the host computer maps to a target one of the different rendering engines at least one directive embedded in content retrieved by the content browser, selects the target one of the different rendering engines for rendering the content and passes the content to the selected target one of the different rendering engines Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for content driven selection of a rendering engine;

FIG. 2 is a schematic illustration of a content browsing data processing system configured for content driven selection of a rendering engine; and, FIG. 3 is a flow chart illustrating a process for content driven selection of a rendering engine.

DETAILED DESCRIPTION OF THE INVENTION

Embodiments of the invention provide for content driven selection of a content browser. In accordance with an embodiment of the invention, content retrieved for a content browser from a content source can be parsed and embedded directives can be compared to a table of known directives and corresponding target rendering engines (also known in the art as "layout engines"). Upon detecting an embedded directive, the corresponding target rendering engine can be identified and the content can be passed to a local instance of the target rendering engine for rendering in the content browser. Alternatively, a content browser associated with the target rendering engine can be selected to both render and display the content. In the former instance, to the extent that an instance of the target rendering engine is not available locally, the content can be passed to a remotely disposed instance of the target rendering engine.

In further illustration, FIG. 1 pictorially depicts a process for content driven selection of a rendering engine. As shown in FIG. 1, different directives 110 embedded in content 120 retrieved from a content source such as a Web site can be processed in rendering engine selection system 130. Each directive can be compared in the rendering engine selection system 130 to a table 140 mapping the directives 110 to a target rendering engine 150A, 150B, 150N. Further, the severity of an incompatibility arising from the presence of each of the directives can be included in the table 140. Based upon a largest number of the directives 110 mapped to a corresponding one of the target rendering engines 150A, 150B, 150N, optionally weighted according to the severity of a resulting incompatibility of each of the directives 110, a particular one of the target rendering engines 150A, 150B, 150N can be selected to render the content 120 in the content browser 160.

The process described in connection with FIG. 1 can be implemented in a content browsing data processing system. In further illustration, FIG. 2 schematically depicts a content browsing data processing system configured for content driven selection of a rendering engine. The system can include a host computer 210 configured for coupling to multiple different content sources 220 over a computer communications network 230 such as the global Internet. The host computer 210 can support the execution of an operating system 240 hosting the operation of a content browser 250. The content browser 250 in turn can be configured to request and retrieve content from the different content sources 220 from over the computer communications network 230. Using one or more coupled rendering engines 260 (which locally coupled or remotely coupled), the content browser 250 can render retrieved content for viewing by an end user.

Of note, target rendering engine selection module 270 can be coupled to the content browser 250. The target rendering engine selection module 270 can include program code that when executed by a processor of the host computer 210 can be enabled to parse retrieved content for the content browser 250 to detect embedded directives present in a directive mapping 280. The directive mapping 280 can map different directives in content such as CSS directives, HTML directives, or javascript directives to different ones of the target rendering engines 260. The program code of the module 270 further can be enabled upon execution by the processor of the host computer 210 to weight each detected directive according to a pre-determined severity of incompatibility to the extent that the directive is processed in an incompatible one of the target rendering engines 260. Finally, the program code of the module 270 can be enabled upon execution by the processor of the host computer 210 to select a pre-dominate mapped one of target rendering engines 260 (subject to the weighting) for use in rendering the content in the content browser 250.

In yet further illustration of the operation of the target rendering engine selection module 270, FIG. 3 is a flow chart illustrating a process for content driven selection of a rendering engine. Beginning in block 300, content can be retrieved for display in a content browser and in block 310, the content can be parsed to detect different directives embedded in the content. In block 320, a first directive can be detected in the content for processing and in block 330, a target rendering engine for the directive can be identified. In block 340, it can be determined whether or not one or more counterbalancing directives are present in the markup to negate the impact of the directive if processed by an incompatible target rendering engine, such as the presence of one or more alternative directives for different target rendering engines. If so, the process can continue to block 380. Otherwise, the process can continue in block 350. In block 350, it can be determined if the impact of an incompatibility of the directive results in a mere cosmetic flaw, or a functional flaw. If the former, again the process can continue through block 380. Otherwise, the process can continue in block 360.

In block 360, a severity of incompatibility can be determined for the directive. That is, the severity of the result if the directive is processed by an incompatible target rendering engine can be rated for the directive. In block 370, the severity rating, along with the directive and target rendering engine can be stored and, in decision block 380, if additional directives remain to be processed in the content, the process can repeat through block 320 with the selection of a next directive in the content for processing. In block 390, when no further directives remain to be processed, each stored reference to the target rendering engine for a directive can be weighted according to the rated severity and a weighted sum can be computed for each referenced target rendering engine in block 390. In block 400, the target rendering engine most prevalent as weighted can be selected to render the content and in block 410, the content can be passed for rendering to the selected target rendering engine. Alternatively, a content browser including the target rendering engine most prevalent as weighted can be selected both to display the content subsequent to rendering by the target rendering engine.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for content driven selection of a rendering engine, the method comprising:
retrieving content for display in a content browser executing in memory by a processor of a host computer;
mapping at least one directive embedded in the retrieved content to a target rendering engine;
selecting the target rendering engine for rendering the content; and,
passing the content to the selected target rendering engine;
wherein mapping at least one directive embedded in the retrieved content to a target rendering engine, comprises mapping a plurality of directives embedded in the retrieved content each to one of a selection of different target rendering engines, rating each of the mapped directives according to a severity of incompatibility with a target rendering engine that differs from a mapped one of the different target rendering engines, weighting each instance of a mapped one of the target rendering engines by a rating applied to a corresponding one of the directives, and combining the weighted instances for each mapped one of the target rendering engines; and,
wherein selecting the target rendering engine for rendering the content, comprises selecting a target rendering engine for rendering the content corresponding to a greatest combination of weighted instances of mapped ones of the different target rendering engines.

2. The method of claim 1, wherein passing the content to the selected target rendering engine, comprises passing the content to the selected target rendering engine over a computer communications network.

3. The method of claim 1, wherein passing the content to the selected target rendering engine, comprises passing the content to a content browser including the selected target rendering engine.

4. The method of claim 1, further comprising excluding from mapping any directive having an incompatibility for a target rendering engine negated by another directive embedded in the content.

5. The method of claim 1, further comprising excluding from mapping any directive having an incompatibility for a target rendering engine resulting only in a cosmetic flaw when displaying the content in a content browser using an incompatible target rendering engine.

6. A content browsing data processing system comprising:
a host computer with processor and memory;
a content browser executing in the memory by the processor of the host computer;
a plurality of different rendering engines coupled to the content browser; and,
a target rendering engine selection module coupled to the content browser, the module comprising program code that when executed by the processor of the host computer maps to a target one of the different rendering engines at least one directive embedded in content retrieved by the content browser, selects the target one of the different rendering engines for rendering the content and passes the content to the selected target one of the different rendering engines;
wherein each of a plurality of directives embedded in the retrieved content is mapped to one of a selection of different target rendering engines, each of the mapped directives is rated according to a severity of incompatibility with a target rendering engine that differs from a mapped one of the different target rendering engines, each instance of a mapped one of the target rendering engines is weighted by a rating applied to a corresponding one of the directives, and the weighted instances for each mapped one of the target rendering engines are combined; and,
wherein a target rendering engine for rendering the content is selected corresponding to a greatest combination of weighted instances of mapped ones of the different target rendering engines.

7. A computer program product comprising a computer usable memory embodying computer usable program code for content driven selection of a rendering engine, the computer program product comprising:

computer usable program code for retrieving content for display in a content browser executing in memory by a processor of a host computer;
computer usable program code for mapping at least one directive embedded in the retrieved content to a target rendering engine;
computer usable program code for selecting the target rendering engine for rendering the content; and,
computer usable program code for passing the content to the selected target rendering engine;
wherein the computer usable program code for mapping at least one directive embedded in the retrieved content to a target rendering engine, comprises computer usable program code for mapping a plurality of directives embedded in the retrieved content each to one of a selection of different target rendering engines, rating each of the mapped directives according to a severity of incompatibility with a target rendering engine that differs from a mapped one of the different target rendering engines, weighting each instance of a mapped one of the target rendering engines by a rating applied to a corresponding one of the directives, and combining the weighted instances for each mapped one of the target rendering engines; and,
wherein the computer usable program code for selecting the target rendering engine for rendering the content, comprises computer usable program code for selecting a target rendering engine for rendering the content corresponding to a greatest combination of weighted instances of mapped ones of the different target rendering engines.

8. The computer program product of claim 7, wherein the computer usable program code for passing the content to the selected target rendering engine, comprises computer usable program code for passing the content to the selected target rendering engine over a computer communications network.

9. The computer program product of claim 7, wherein the computer usable program code for passing the content to the selected target rendering engine, comprises computer usable program code for passing the content to a content browser including the selected target rendering engine.

10. The computer program product of claim 7, further comprising computer usable program code for excluding from mapping any directive having an incompatibility for a target rendering engine negated by another directive embedded in the content.

11. The computer program product of claim 7, further comprising computer usable program code for excluding from mapping any directive having an incompatibility for a target rendering engine resulting only in a cosmetic flaw when displaying the content in a content browser using an incompatible target rendering engine.

* * * * *